United States Patent [19]

Evans

[11] 3,985,852

[45] Oct. 12, 1976

[54] METHOD OF MAKING TUBULAR PLASTIC SLEEVES

[75] Inventor: Joseph H. Evans, Palo Alto, Calif.

[73] Assignee: Raychem Corporation, Menlo Park, Calif.

[22] Filed: May 27, 1975

[21] Appl. No.: 580,596

Related U.S. Application Data

[62] Division of Ser. No. 369,836, June 14, 1975, Pat. No. 3,894,731.

[52] U.S. Cl. .................................... 264/132; 101/1; 101/426; 197/1 R; 197/144; 264/230; 264/294; 264/342 R; 264/320

[51] Int. Cl.[2] ................... B29C 17/00; B29C 23/00; B29F 5/00

[58] Field of Search ................ 264/230, 132, 342 R, 264/294, 320; 101/1, 426; 197/1 R, 144

[56] References Cited

UNITED STATES PATENTS

| | | | |
|---|---|---|---|
| 2,027,962 | 1/1936 | Currie | 264/230 |
| 3,086,242 | 4/1963 | Cook et al. | 264/95 |
| 3,212,207 | 10/1965 | Searing | 40/316 |
| 3,297,819 | 1/1967 | Wetmore | 174/127 |
| 3,318,240 | 5/1967 | Boggess | 101/401.2 |
| 3,423,503 | 1/1969 | York | 264/338 |
| 3,721,749 | 3/1973 | Clabburn | 174/88 R |
| 3,775,527 | 11/1973 | Kinney et al. | 264/159 |

FOREIGN PATENTS OR APPLICATIONS

| | | |
|---|---|---|
| 1,022,655 | 1/1958 | Germany |
| 2,323,799 | 11/1974 | Germany |
| 6,806,900 | 11/1968 | Germany |
| 1,150,913 | 5/1969 | United Kingdom |

*Primary Examiner*—Willard E. Hoag
*Attorney, Agent, or Firm*—Lyon & Lyon

[57] ABSTRACT

Method of making marker assemblies comprising an elongate denticule whose flat, pendent tines bear in snug and slidable relation heat recovered sleeves which conform to the flattened configuration of the tines. After positioning generally tubular heat recoverable sleeves over the pendent tines and recovery of the same, printed information may be imparted to the tine-borne sleeves, which thereafter may be removed from the denticular support and employed as identifying markers for electrical wire and the like.

5 Claims, 5 Drawing Figures

METHOD OF MAKING TUBULAR PLASTIC SLEEVES

This is a division of application Ser. No. 369,836, filed June 14, 1975 and now U.S. Pat. No. 3,894,731.

BACKGROUND OF THE INVENTION

Industry finds frequent need for identifying markers employed in tagging components of complicated assemblies. This is particularly so in the case of complex electrical assemblies such as, e.g., wiring systems employed in aircraft and the like. In such cases, the practice heretofore has been to impress identifying characters into the insulation of electrical conductors, an expedient which risks impairment of insulative integrity. More recently, it has become common to impress or print identifying information onto plastic tubes which are then slipped over the opposite ends of electrical conductors, permitting their tracing when combined with other such conductors in a cable bundle. That process, proceeding as it does on a substantially piecemeal basis, has proved undesirably laborious and, in addition, the dimensional tolerance required for facile addition of the tubular markers to electrical conductors has permitted their free movement on the conductor, so as to require a sharp bend in the wire end to prevent loss of the marker during handling of the free conductor.

Conceivably, the problems of piecemeal printing on wire markers and the like could be alleviated to a degree by a "ticker tape" approach in which a tube was flattened and fed through a typewriter. However, such a system would require extensive typewriter feed system modifications. Moreover, the type, ribbon and platen of a conventional typewriter are designed to make clean impressions on relatively hard, smooth surfaces. In the case of a merely flattened tube, the keys would strike a double layer of soft plastic separated by a small air gap, likely resulting in fuzzy, multiple impressions with standard type mechanisms. Again, by the ticker tape route, the markers are attached in order end to end, so that only the markers at the ends of any given group would be available for installation. Moreover, care would be required to prevent a twist in the tube during the typing since any twist would cause the type to spiral about the tube. With the "ticker tape" tube designed to be heat-shrinkable for minimum bulk installation on a wire or cable, it would not be susceptible to radiant heating to render indelible printed characters thereon, because that heating would prematurely effect heat recovery. Finally, such a tubular marker, unless made heat recoverable would continue to pose the retention problem previously alluded to, i.e., the necessity that wire ends be bent to prevent loss during handling after marker application.

Until the present invention, a need existed for a marker system free of the foregoing problems.

BRIEF SUMMARY OF THE INVENTION

According to this invention there is provided an assembly and a method for forming such an assembly, the assembly comprising a support having an elongate spine from at least one side of which transversely project a plurality of flat tines spaced one apart from another, and a plurality of flattened tubular plastic sleeves snugly and slidably disposed over the tines so as to permit removal therefrom when drawn past the ends of the tines distant from the spine. The sleeves are heat recovered onto the tines, assuming their flattened configuration so as to present a flat surface to a printing mechanism such as a typewriter key, which key is enabled to leave on the sleeve surface a clear impression by reason of the backstop provided during typing by the tine. The heat recovered sleeves retain their flattened configuration when removed from the tines of their denticular support. However, when pressure is applied from their opposite sides, they open out to receive a wire. Release of pressure causes the information-bearing sleeve attempt to reassume its flattened configuration, so that the marker sleeve grips the wire about which it has been disposed much in the manner of a spring clip.

The manner in which these and other objects and advantages of the invention are achieved will become clear from the description of preferred embodiments which follows and from the accompanying drawing in which.

DETAILED DESCRIPTION OF THE INVENTION

Figure 1:
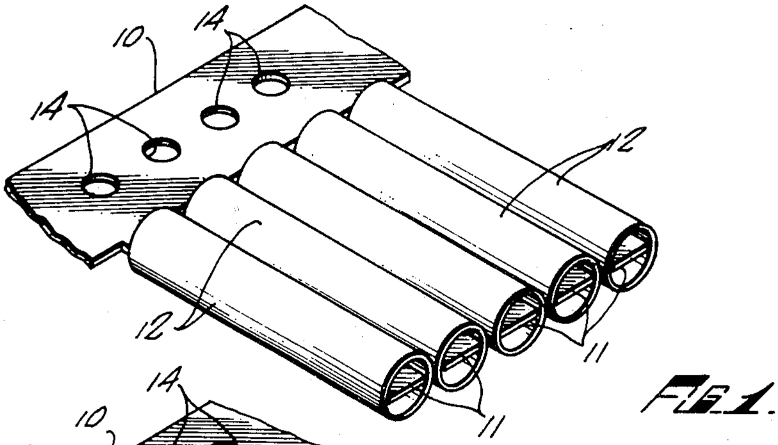
FIG. 1 is a partial pictorial view of an assembly according to one embodiment of this invention prior to heat recovery of the sleeves about appendages of a denticular support.
Figure 2:
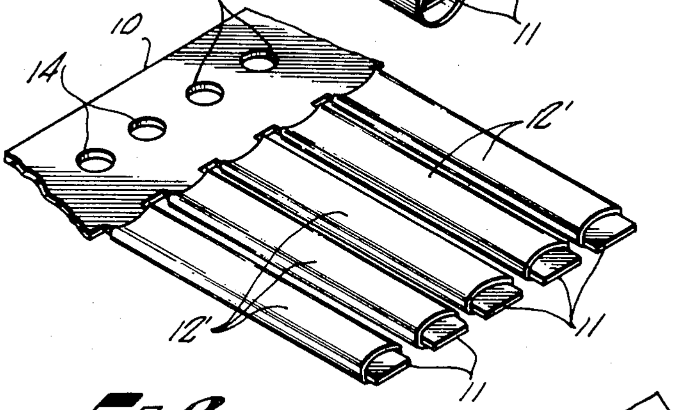
FIG. 2 is a partial pictorial view of the assembly of FIG. 1 following heat recovery of the sleeves.

With reference first to FIGS. 1 and 2, from one side of elongate spine 10 project a plurality of flat tines 11 spaced one apart from another. Alternatively, of course, tines could extend from each side of the spine, facilitating typing of identical information on the so aligned sleeve pairs borne by the oppositely extending tines. Heat recoverable or heat heat shinkable sleeves 12 are disposed over individual ones of tines 11. Preferably, a release agent is disposed between the sleeves and tines, as by dip-coating the tines in such an agent or by dip-coating with such an agent the interior of a tubular member from which sleeves 12 are later cut. As appears from FIG. 2, upon heat recovery or shrinkage of the sleeves, the recovered sleeves 12' snugly and slidably conform to the flattened configuration of the tines 11, while admitting of ready removal therefrom when drawn past the ends of the tines distant from spine 10.

Figure 3:
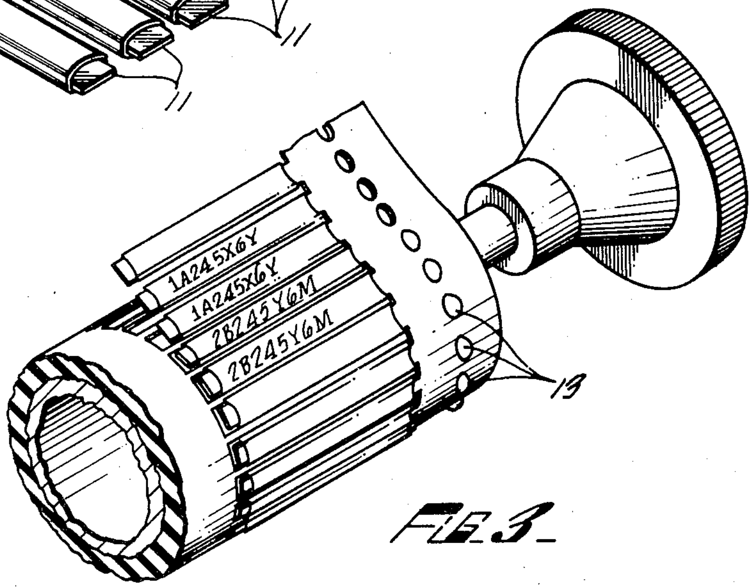
FIG. 3 is a partial pictorial view of a typewriter platen bearing an assembly like that of FIG. 2 in the course of the addition of printed information thereto.

One advantage of this invention is that the denticule-sleeve assembly admits of facile impartation of printed information to the sleeves. FIG. 3 depicts the platen of a conventional typewriter modified essentially only in that indentations have been cut into the hard rubber surface of the platen to receive and position the sleeves for presentation to the typewriter keys (additionally, if desired as an aid in registration, the platen may be provided with sprocket wheel whose teeth 13 engage a train of perforations 14 disposed along the length of spine 10). Thus, with but minor modification, a conventional typewriter platen can be ideally configured for rapid printing of identifying information on the marker sleeve assembly. The unindented portion of the platen can be used for conventional typing or an unmodified platen substituted by the typist whenever conventional typing is called for.

Typically, the heat absorptive characteristics of the dark printed characters will be such as to permit their being rendered indelible by exposure to radiant heat, all without unduly discoloring in the surrounding, printed portions of the flattened surface. Thus, once printed indicia are added to the marker assembly, the same can be conveyed past, for example, an infrared source, effectively and indelibly "burning" the characters into the substance of the sleeve.

Preferably, the uncovered sleeves 12 are manufactured so as to "remember" an interior circumferential dimension on the order of twice the width of tines 11 so that while recovery results in a snug disposition of the sleeves over the tines, the sleeves do not tend to substantially further recover when freed of the tines and raised to their recovery temperature. However, in particular instances where it is desired that the marker sleeve once free of its tine support and disposed over a wire or the like be heat recoverable to a low profile configuration, that may be done simply by appropriate sleeve dimensioning prior to impartation of heat recoverability. In such cases, the tendency of sleeves recovered about the tines to attempt further recovery when subjected to radiant heat in course of rendering indelible their printed indicia is thwarted by the tines themselves.

Generally, the unrecovered sleeves are recoverable to an interior circumferential dimension ranging from about the width of the tines 11 to twice their width, depending upon whether one wishes further recovery once the sleeve is disposed about a wire.

Figure 4:
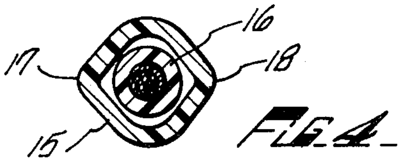
FIGS. 4 and 5 are end views of an electrical conductor and respectively illustrate the retentive "spring-action" of marker sleeves formed according to this invention.
Figure 5:
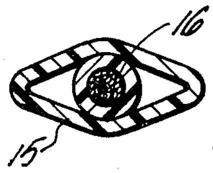

FIGS. 4 and 5 illustrate the retentive spring-action of a marker sleeve 15 prepared according to the invention when disposed about an electrical conductor 16. With reference to FIG. 4, imposition of pressure on opposite edges 17 and 18 of the sleeve causes its mid-portions to bow out, permitting ready insertion of conductor 16. When pressure is released, the flexible sleeve clamps the conductor 16 so that while on the one hand it is retained during handling of conductor 16, on the other it may be readily rotated about the conductor to present the identifying information it bears to whatever direction.

The denticular support material is chosen to withstand exposure to the temperature of sleeve recovery and in the case where it is desired that sleeves be further heat recoverable when removed from their tine supports, is made sufficiently rigid as to withstand recovery forces without substantial deflection. At the same time, it is preferred that the material be sufficiently flexible as to admit of disposition about the platen of a conventional typewriter. In the case where the sleeves borne by the support are to be exposed to relatively greater temperatures in order to render printed characters thereon indelible, the support preferably has a high heat deflection temperature. However, as discussed infra, most of that portion of the support not covered by the sleeves recovered thereon is heat-shielded during the indelibilization process, so that the support does not "see" temperatures of the magnitude "seen" by the exposed sleeve surface. The preferred denticular support material is nylon 66, although those skilled in the art will readily appreciate that many other materials may be used, e.g., stiff cardboard, flexible metal stock, etc. The tines are preferably integral with the spine element of the support, and in such case the denticule is cut from sheet stock in such manner as to insure that any burrs are directed away from that surface adjacent the recovered sleeve surface upon which printing is to be effected. Otherwise, it may be that in course of typing portions of the sleeve will be "impaled" on the burrs, making removable of the sleeve from its supporting tine somewhat difficult.

As before noted, the release agent may be coated on the denticular support or alternatively coated on the interior of the sleeves. Where a lubricious release material is used, preferably it is one which either is not volatilized during indelibilization or one whose volatile by products are not harmful. Preferred as a release agent or lubricant is a mixture of 95 parts by weight tricholoroethane and 5 parts by weight silicone stopcock grease such as that available from the Dow Corning Corporation.

The heat recoverable sleeves of the invention are formed from material comprising polymeric material capable of having plastic or elastic memory imparted thereto. Materials having such memory have been dimensionally changed from an original heat stable configuration to a dimensionally heat unstable configuration tending to move in the direction of the original configuration upon the application of heat alone. The terms "plastic memory" and "elastic memory" are used interchangeably herein and are intended to be mutually inclusive.

Examples of such heat recoverable materials are found in Currie, U.S. Pat. No. 2,027,962, Cook et al., U.S. Pat. No. 3,086,242, and Clabburn, U.S. Pat. No. 3,721,749, the disclosures of which are incorporated herein by reference. One method of making a heat recoverable material consists in exposing a thermoplastic material to an amount of heat which is insufficient to allow the material to melt but sufficient to allow the molecular structure to become distorted; and then distorting the material to a new configuration and cooling the material in its distorted state. Subsequent increases in temperature sufficient to reduce locked-in stresses caused by the initial plastic deformation will cause the article to tend to recover to its initial state.

Another manner in which heat recoverable articles are generally made involves the formation of a polymeric article having a first dimension, followed by crosslinking of the polymer. The crosslinking can be effected by chemical means, e.g., with peroxides, or by irradiation or by combinations of the two. Radiation employed can be of various types including charged particles, i.e., beta and alpha, neutral particles, i.e., neutrons, and electromagnetic, i.e., gamma and ultraviolet, as is well known. Subsequent heating of the material will melt the crystals in a crystalline thermoplastic material or significantly lessen other internal molecular forces such as hydrogen bonding or dipoledipole interactions to an extent sufficient to allow distortion of the product. Upon cooling of the heated and distorted article, there is obtained a product which remains in its distorted shape while at room temperature, due to the reformation of strong interchain forces such as crystallinity which at low temperatures dominate the contrary stresses resulting from crosslinking. Upon reheating, the crosslink forces become dominant and the material tends to recover to its original geometry.

When irradiation is used, doses of any desired amount can be used although, generally, a dosage of from 5 to 50, preferably 20–25 megarads will be sufficient.

As exemplary of the polymeric materials to which heat recoverability can be imparted by the above and other means may be mentioned polyolefins such as polyethylene, polybutene, various copolymers of ethylene, propylene and butene, polyvinyl halides, e.g., polyvinyl chloride; ionomers and polyurethanes.

For optimal printability, the polymeric material of which the recoverable sleeve is formed contained a substantial proportion of filler material. The preferred sleeve material contains 40 parts by weight low density polyethylene, 15 parts by weight ethylene-ethylene acrylate copolymer 8 parts by weight white pigment, 31 parts by weight flame retardant, and 6 parts by weight antioxidant. The recovery temperature of a sleeve so composed is on the order of about 105°–110° C.

Typewritten information contained on sleeves formed of the foregoing preferred composition was indelibilized by exposing the support-borne sleeves to a quartz tungsten filament for a short period (e.g., approximately 0.7 seconds) during which time the temperature of the print portions of the sleeve is believed to have been raised to ca. 315° C. Where this preferred additional step of the printing process is practiced, those skilled in the art of plastics printing are well able to determine what times and temperatures will suffice for whatever plastic material.

While my invention has been described by reference to preferred embodiments thereof, it will be understood that the invention is not limited thereto, but only to the lawful scope of the appended claims.

I claim:

1. A method of forming flattened sleeves having printed indicia thereon, comprising the steps of disposing over individual ones of a plurality of flat tines spaced one apart from another and transversely pendant from at least one side of an elongate spine individual ones of a plurality of tubular plastic sleeves heat shrinkable to a lesser diametral dimension, and heating said sleeves about said tines to bring the former into snug and slidable relation conforming to the flat configuration of said tines and printing indicia on flat portions of said sleeves while said sleeves are conformed to flattened portions of said tines.

2. A method according to claim 1 wherein a release agent is disposed between said tines and said sleeves.

3. A method according to claim 2 wherein prior to disposition of said sleeves over said tines, the tines are coated with a release agent.

4. A method according to claim 1 wherein the heat absorptivity of the characters making up said printed information is greater than that of unprinted portions of said surface, and which comprises the additional step of exposing printed sleeves carried by said tines to radiant heat sufficient to render said information essentially indelible.

5. A method according to claim 4 wherein said spine is heat-shielded during exposure of said sleeves to said heat.

* * * * *